L. A. STITH.
BREAST COLLAR.
APPLICATION FILED NOV. 24, 1914.
1,179,236. Patented Apr. 11, 1916.
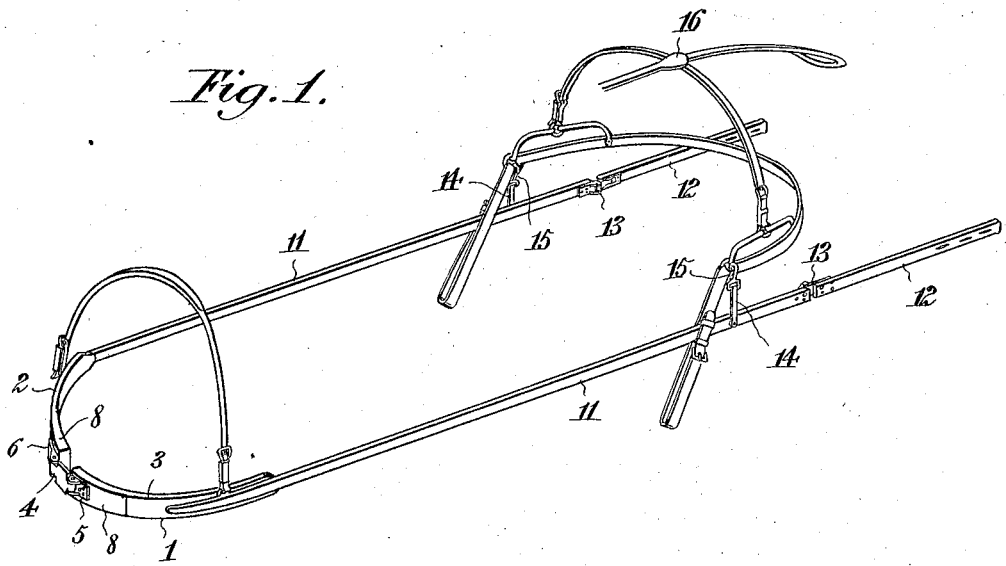
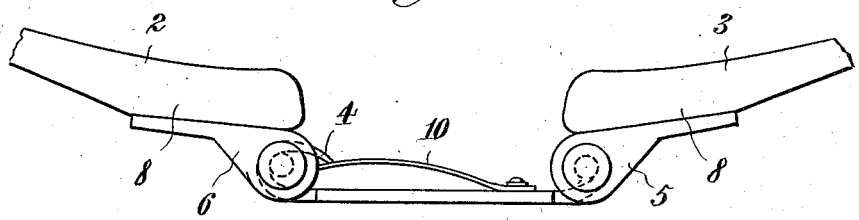
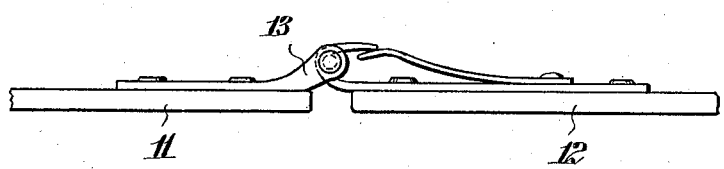

UNITED STATES PATENT OFFICE.

LORD A. STITH, OF MOUNT STERLING, KENTUCKY.

BREAST-COLLAR.

1,179,236.  Specification of Letters Patent.  Patented Apr. 11, 1916.

Application filed November 24, 1914. Serial No. 873,777.

*To all whom it may concern:*

Be it known that I, LORD A. STITH, a citizen of the United States, residing at Mount Sterling, in the county of Montgomery and State of Kentucky, have invented new and useful Improvements in Breast-Collars, of which the following is a specification.

This invention relates to improvements in harness and especially with reference to improvements in the breast collar and traces of harness, the object of the invention being to provide an improved form of breast collar which may be put on or removed from a horse without passing the shoulder straps over his head, another object of the invention being to provide a breast collar harness with detachable trace members which may be left permanently connected to the swingletree and the main trace members of which may be left permanently connected to the breeching so that the harness may be readily placed on or removed from the horse.

The invention consists in the construction, combination and arrangement of devices hereinafter described and claimed.

In the accompanying drawings: Figure 1 is a perspective view of the breast collar, traces and breeching of a harness constructed in accordance with my invention. Fig. 2 is a detail plan of the breast collar. Fig. 3 is a detail plan of one of the traces.

In accordance with my invention the breast collar 1 comprises a pair of members 2 and 3 which, are detachably connected together at the front by a hook 4 one end of which is pivotally connected by a pintle pin on an attaching plate 5 secured to one of said members, said hook having on its other end shoulders and a bill in advance of the shoulders by means of which the hook may be detachably connected to a pintle pin between spaced ears on the other attaching plate 6 on the other member. The attaching plates are on the front sides of the breast collar members so that the connecting hook is spaced forwardly of the breast collar and the front ends of the members are also spaced apart by the shoulders on the hook contacting with the spaced ears on the attaching plate 6, said members are thickened as at 8, so that pressure is entirely relieved from the throat of the animal and he is permitted to breathe freely and his comfort thereby greatly promoted.

To disconnect the breast collar members the hook need only be detached from pintle pin on the attaching plate 6 as will be understood. The hook has a spring 10 which closes against its bill and prevents casual detachment of the bill of the hook from the pintle pin on the attaching plate 6. The breast collar may be readily put on a horse or removed by first disconnecting the members of the collar and necessity for passing the collar over the horse's head is entirely avoided.

Each trace comprises a front member 11 and a detachable rear member 12, the said members being detachably connected together by hooks or other suitable devices 13. The rear members of the traces may be left permanently connected to the whiffletree or swingletree if desired and the rear ends of the front or main members of the traces are connected by straps 14 and snap hooks or other suitable devices 15 to the breeching 16. Hence when unharnessing a horse it is only necessary to disconnect the rear portions of the traces from the main portion thereof so as to leave the front portions of the traces connected to the breeching for removal from the horse and avoiding all necessity of tying up the traces to prevent them from dragging on the earth or in the mud.

Having thus described my invention, I claim:—

1. In a harness, a breast collar comprising a pair of members having thickened end portions, plates secured to the thickened ends of said members and provided with spaced ears, pintle pins extending transversely between said ears, a hook having an end pivotally secured to one of said pins between the ears on one of the plates, a bill at the other end of the hook for receiving the pintle pin between the ears on the other plate, and shoulders upon the hook in the rear of the bill arranged to contact with the ears on the last mentioned plate whereby said members are held in spaced relation.

2. In a harness, a breast collar comprising a pair of members having thickened end portions in spaced relation, plates secured to said end portions and provided with spaced ears, a hook having one end mounted for swinging movement between the ears on one of said plates, shoulders near the opposite end of said hook for contact with the ears on the other plate, a pintle pin extending transversely between the ears which contact with the shoulders and the hook, a bill on the hook in advance of said shoulders for engagement with the pintle pin, and a spring member carried by the hook and having one end arranged to extend within the bill and close the entrance thereto.

In testimony whereof I affix my signature in presence of two witnesses.

LORD A. STITH.

Witnesses:
J. H. CONNOR,
F. M. HILL.

Copies of this patent may be obtained for five cents each, by addressing the "Commissioner of Patents, Washington, D. C."